United States Patent
Wakitani et al.

(10) Patent No.: US 8,039,991 B2
(45) Date of Patent: Oct. 18, 2011

(54) COGENERATION SYSTEM WITH FIRST AND SECOND POWER PLANTS

(75) Inventors: Tsutomu Wakitani, Saitama (JP);
Yoshinori Nakagawa, Saitama (JP);
Hiroyuki Eguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 613 days.

(21) Appl. No.: 12/069,924

(22) Filed: Feb. 12, 2008

(65) Prior Publication Data
US 2008/0196413 A1  Aug. 21, 2008

(30) Foreign Application Priority Data

Feb. 19, 2007 (JP) .................................. 2007-038224
Feb. 19, 2007 (JP) .................................. 2007-038226

(51) Int. Cl.
*H02J 1/00* (2006.01)
*H02J 3/00* (2006.01)

(52) U.S. Cl. ................. 307/80; 307/11; 307/18; 307/43; 310/58; 310/64

(58) Field of Classification Search ................. 307/80
See application file for complete search history.

(56) References Cited

U.S. PATENT DOCUMENTS

| | | | | |
|---|---|---|---|---|
| 2,294,515 A | * | 9/1942 | Senauke et al. ................. | 60/702 |
| 4,539,515 A | * | 9/1985 | Morishita et al. ............. | 320/123 |
| 5,127,470 A | * | 7/1992 | Inaba et al. ............... | 165/104.12 |
| 6,177,738 B1 | * | 1/2001 | Hentunen et al. ................ | 307/67 |
| 6,882,904 B1 | * | 4/2005 | Petrie et al. ................... | 700/295 |
| 2004/0051387 A1 | | 3/2004 | Lasseter et al. | |
| 2005/0134120 A1 | * | 6/2005 | Nguyen et al. ................... | 307/43 |
| 2005/0200205 A1 | * | 9/2005 | Winn et al. ..................... | 307/64 |
| 2006/0022524 A1 | * | 2/2006 | Bryde et al. ..................... | 307/64 |
| 2006/0071554 A1 | * | 4/2006 | McNamara et al. ......... | 307/10.1 |
| 2006/0202559 A1 | | 9/2006 | Hashimoto et al. | |

FOREIGN PATENT DOCUMENTS

| | | |
|---|---|---|
| JP | 05-328615 | 12/1993 |
| JP | 2005-006414 A | 1/2005 |
| JP | 2006-158159 A | 6/2006 |
| JP | 2006-254537 A | 9/2006 |
| JP | 2007-006595 A | 1/2007 |

OTHER PUBLICATIONS

JP Pg-pub 2002-374628 to Fukada—english translation, Dec. 26, 2002.* JP Pg-pub 2006-280178 to Kotani—english translation, Oct. 12, 2006.*

* cited by examiner

*Primary Examiner* — Rexford Barnie
*Assistant Examiner* — Justen Fauth
(74) *Attorney, Agent, or Firm* — Carrier Blackman & Associates, P.C.; Joseph P. Carrier; William D. Blackman (57) ABSTRACT

In a cogeneration system having a first power plant connected to an AC power feed line between a power network and an electrical load and a first internal combustion engine for driving the first power plant such that exhaust heat of the first engine is supplied to a thermal load, power supply from the first power plant to the power network is interrupted by turning off a switch installed in the feed line, when outage of the power network is detected and a second power plant is operated, such that outputs of the first and second power plants are supplied to the electrical load. With this, it becomes possible to respond to a commercial power network outage for preventing reverse flow of the power output by the cogeneration system into the power network and supplying as much electric power as possible to the electrical load.

8 Claims, 5 Drawing Sheets

COGENERATION SYSTEM WITH FIRST AND SECOND POWER PLANTS

BACKGROUND OF THE INVENTION

1. Field of the Invention

This invention relates to a cogeneration system, particularly to a cogeneration system responsive to a commercial power network outage for supplying a load with as much electric power as possible.

2. Description of the Related Art

In recent years, cogeneration systems have been developed that are equipped with an internal combustion engine-driven generator for installation in an AC power supply line between a commercial power network and an electrical load for supplying power to the load in interconnection with the power network and also for supplying hot water or air or the like heated using exhaust heat from the engine to a thermal load. Such a cogeneration system is taught, for example, by Japanese Laid-Open Patent Application No. Hei 5-328615 ('615).

In the configuration according to the technology taught by '615, an engine-operated, on-site power generation plant is connected to an on-site load and three other loads are connected to be switchable between a commercial power utility (commercial power network) and the engine-operated, on-site power generation plant. When the operating load of the on-site load exceeds a predetermined value, the other three loads are connected to the commercial power utility side and as the amount of operating load decreases below the predetermined value, the other three loads are sequentially connected to the engine-operated, on-site power generation plant.

When the power network interconnected with this type of cogeneration system experiences an outage, the ordinary practice is to shut down the cogeneration system to prevent a reverse flow of its power output into the power network. Alternatively, it is conceivable to not shut down the cogeneration system at the time of a power failure but to keep it operating for supplying power to the electrical load. In this case, however, the maximum amount of power that can be supplied is limited to the inherent maximum output of the cogeneration system.

SUMMARY OF THE INVENTION

An object of this invention is therefore to overcome the foregoing disadvantage by providing a cogeneration system that is responsive to a commercial power network outage for preventing reverse flow of the power output by the cogeneration system into the power network and supplying as much electric power as possible to the electrical load.

In order to achieve the object, this invention provides a cogeneration system having a first power plant connected to an AC power feed line between a power network and an electrical load and a first internal combustion engine for driving the first power plant such that exhaust heat of the first engine is supplied to a thermal load, comprising: a second power plant connected to the feed line at a connection in parallel with the first power plant; a switch installed in the feed line at a location upstream of the connection; a power network outage detector that detects outage of the power network; a power supply interrupter that interrupts power supply from the first power plant to the power network by turning off the switch, when the outage of the power network is detected; and a power plant operator that operates the second power plant, such that outputs of the first and second power plants are supplied to the electrical load when the power supply from the first power plant to the power network is interrupted.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

Cogeneration systems according to embodiments of the invention will now be explained with reference to the attached drawings.

Figure 1:
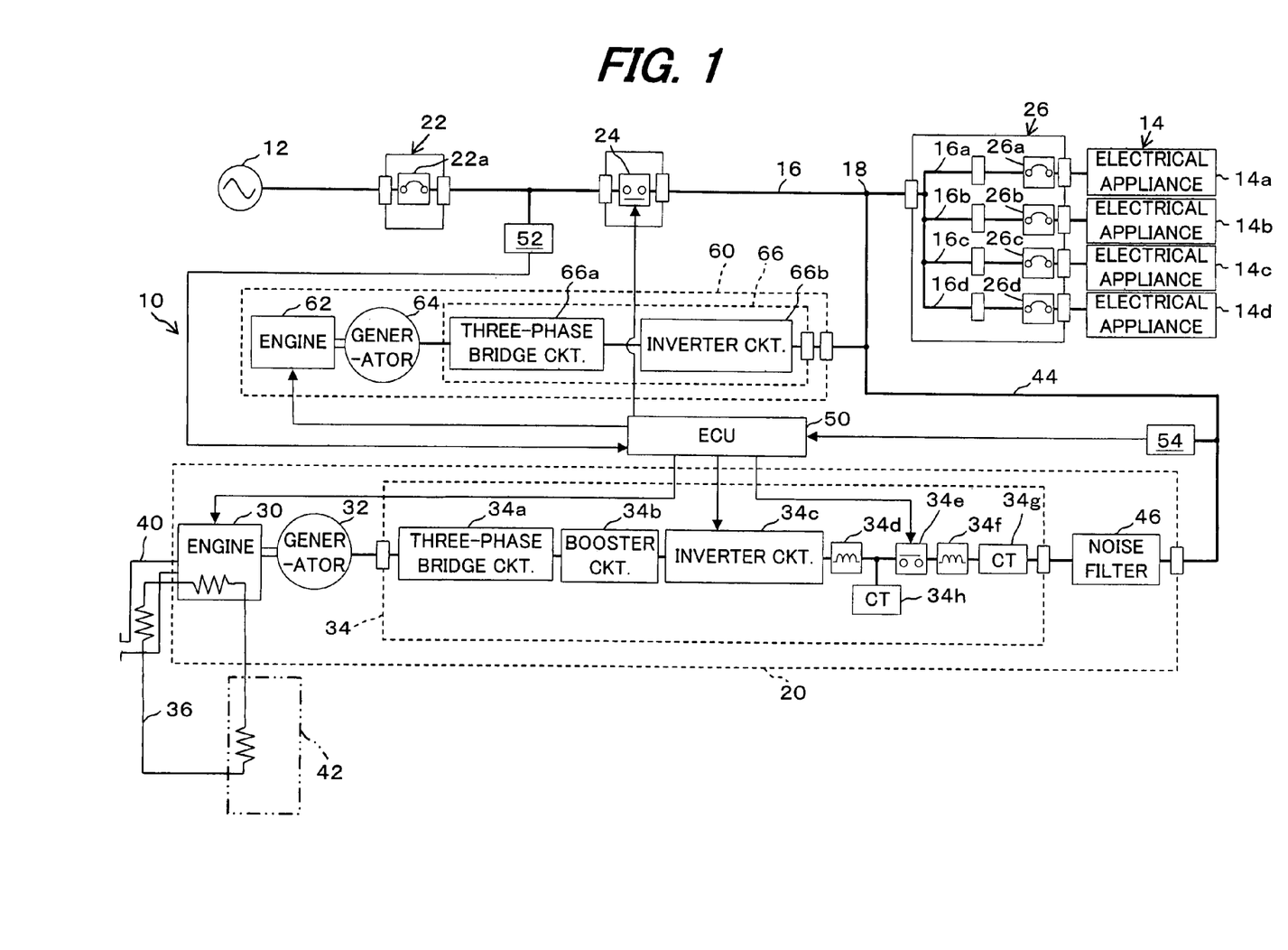
FIG. 1 is a block diagram giving an overall view of a cogeneration system according to a first embodiment of this invention.

FIG. 1 is a block diagram giving an overall view of a cogeneration system according to a first embodiment of this invention.

As illustrated, the cogeneration system (designated by reference numeral 10) is equipped with a first power plant 20 connected through a connection 18 to an AC power feed line (power line; first feed line) 16 between a commercial power network (network power) 12 and an electrical load 14. The power network 12 outputs single-phase, three-wire, 100/200 V, 50 Hz (or 60 Hz) AC power.

The first power plant 20, which will be explained further below, has a relatively small output and is suitable for use at homes and the like. The electrical load 14 includes a plurality of, specifically four electrical AC appliances 14*a*, 14*b*, 14*c*, 14*d*. Typically, 14*a* might be a lighting fixture, 14*b* a washing machine, 14*c* a refrigerator, and 14*d* an air-conditioner.

The first feed line 16 is installed with, in order from the power network 12 side (upstream side), a main breaker box 22, a first switch 24 and a circuit breaker panel 26. It is connected to the electrical load 14 downstream of the panel 26. A main breaker 22*a* for overcurrent protection is installed in the main breaker box 22.

The first switch 24 is installed in the first feed line 16 at a location upstream (on the power network 12 side) of the connection 18 with the first power plant 20. When the first switch 24 is turned ON, the power network 12 is connected with the electrical load 14 and the first power plant 20. When it is turned OFF, the connection with the electrical load 14 and first power plant 20 is broken, thereby preventing supply (reverse flow) of power from the first power plant 20 to the power network 12.

The first feed line 16 divides into four branch lines 16*a*, 16*b*, 16*c*, 16*d* at the circuit breaker panel 26, and the four branches connect with the electrical appliances 14*a*, 14*b*, 14*c*, 14*d* through associated breakers 26*a*, 26*b*, 26*c*, 26*d*. Like the aforesaid main breaker 22*a*, the breakers 26*a* to 26*d* open when the current exceeds predetermined values, thereby preventing the overcurrent from reaching the electrical load 14.

As illustrated in FIG. 1, electrical connection with the main breaker box 22, first switch 24, circuit breaker panel 26 and the like is established through terminals (indicated by small boxes), which will not be described in detail.

The first power plant 20 comprises or includes a first internal combustion engine 30, first generator 32 driven by the first engine 30, and first inverter 34 connected to the first generator 32.

The units making up the first power plant 20 will now be explained.

The first engine 30 is a single-cylinder, four-cycle, water-cooled, spark-ignition, OHV engine that runs on gasoline and has a displacement of, for example, 163 cc. The coolant passage (not shown) of the first engine 30 is connected to piping 36 that passes through the interior of a muffler 40 of the first engine 30 and then into a hot water storage tank (thermal load) 42. The coolant of the first engine 30 flows through the piping 36.

The coolant heated by operation of the first engine 30 is further heated while passing through the muffler 40 and is then sent to the storage tank 42 where it raises the temperature of the water stored in the tank by heat exchange. The coolant cooled by the heat exchange is returned through the upstream segment of the coolant passage to cool the first engine 30. By this process, the exhaust heat of the first engine 30 can be used, for example, to make hot water. The hot water stored in the storage tank 42 is supplied to a thermal load such as a hot-water supply system (not shown) for a kitchen and/or bath.

The first generator 32 comprises a three-phase AC generator. It produces an AC power output when its rotor (not shown) is driven by the first engine 30 controlled to operate at a predetermined engine speed. The first generator 32 is designed to have a maximum power output of, say, 1.0 kW.

The first inverter 34 is equipped with a three-phase bridge circuit (drive circuit) 34a that converts the AC output of the first generator 32 to a DC output, a booster circuit 34b that boosts or steps up the voltage of the DC power rectified by the three-phase bridge circuit 34a to a predetermined voltage, and an inverter circuit 34c that inverts the boosted DC power to AC, i.e., inverts it to single-phase, three-wire, 100/200 V AC power of the same frequency as that of the power supplied by the power network 12. The inverter circuit 34c is equipped with multiple switching elements constituted of insulated-gate bipolar transistors (Insulated-Gate Bipolar Transistors) whose switching action inverts DC to AC.

The first inverter 34 is further equipped with a choke coil 34d that removes noise from the inverter circuit output, a second switch 34e, a common-mode coil 34f that removes noise from the second switch output, and a current sensor (current transformer (CT)) 34g that detects the current, i.e., the amperage of the common-mode coil output.

When the second switch 34e is turned ON, the inverter circuit output is supplied to the electrical load 14, and when it is turned OFF, supply of the output to the load 14 is cut off. A second current sensor 34h is connected between the choke coil 34d and the second switch 34e that produces an output indicating the amperage of the AC current at that point.

The first inverter 34 is connected to the first feed line 16 through a second feed line 44 and the connection 18. The AC power outputted by the first inverter 34 is therefore supplied to the electrical appliances 14a, 14b, 14c, 14d through the second feed line 44, connection 18, first feed line 16 and circuit breaker panel 26 (breakers 26a to 26d). A noise filter 46 is interposed between the first inverter 34 and the second feed line 44 for removing noise from the output of the first inverter 34.

The cogeneration system 10 is further equipped with a microcomputer-based Electronic Control Unit (hereinafter referred to as "ECU") 50, a first current-voltage sensor 52 connected to the first feed line 16 and a second current-voltage sensor 54 connected to the second feed line 44. The first and second current-voltage sensors 52, 54 produce and send to the ECU 50 outputs or signals representing the voltage, current and phase (sine wave) of the AC power on the first and second feed lines 16, 44.

Based on the outputs from the first current-voltage sensor 52, the ECU 50 discriminates or determines whether or not the power network 12 supplies AC power through the first feed line 16, i.e., whether it operates normally or has experienced a power outage and detects the phase and the like of the AC power from the outputs of the current, when it discriminates that the power network 12 supplies AC power.

Also, based on the outputs from the second current-voltage sensor 54, the ECU 50 discriminates whether the first power plant 20 supplies AC power and detects the phase and the like when it discriminates that the first power plant 20 supplies AC power. Based on the so-determined detection values and the like, the ECU 50 controls the operation of the first switch 24, engine 30, inverter circuit 34c, second switch 34e and other system elements. This control will be explained below.

In addition to the first power plant 20, the cogeneration system 10 has a second power plant 60. The second power plant 60 comprises or includes a second internal combustion engine 62, second generator 64 driven by the second engine 62, and second inverter (inverter circuit) 66 connected to the second generator 64.

Like the first engine 30, the second engine 62 is a single-cylinder, four-cycle, water-cooled, spark-ignition, OHV engine that runs on gasoline and has a displacement of, for example, 163 cc. As shown in FIG. 1, the second engine 62 is connected to the ECU 50 through signal line and is controlled by the ECU 50. Although not shown, a battery and starter motors are provided. The battery supplies DC power to the starter motors to crank and start the first and second engine 30, 62.

Like the first generator 32, the second generator 64 comprises a three-phase AC generator and produces an AC power output of 1.0 kW, at maximum, for example when it is driven by the second engine 62.

The second inverter 66 is equipped with a three-phase bridge circuit (drive circuit) 66a that converts the AC output of the second generator 64 to a DC output, and an inverter circuit 66b that, like the inverter circuit 34c, inverts the DC power rectified by the three-phase bridge circuit 66a to AC power in single-phase, three-wire, 100/200 V AC power of the same frequency as that of the power supplied by the power network 12.

The second inverter 66 is connected to the second feed line 44. In other words, the second power plant 60 is connected to the first feed line 16 in parallel with the first power plant 20 and supplies AC power to the electrical load 14 through the second feed line 44. Since the second feed line 44 is connected to the first feed line 16 at the connection 18, the first switch 24 is installed at a location upstream (on the power network 12 side) of the connection 18 where the first and second power plants 20, 60 are connected.

Figure 2:
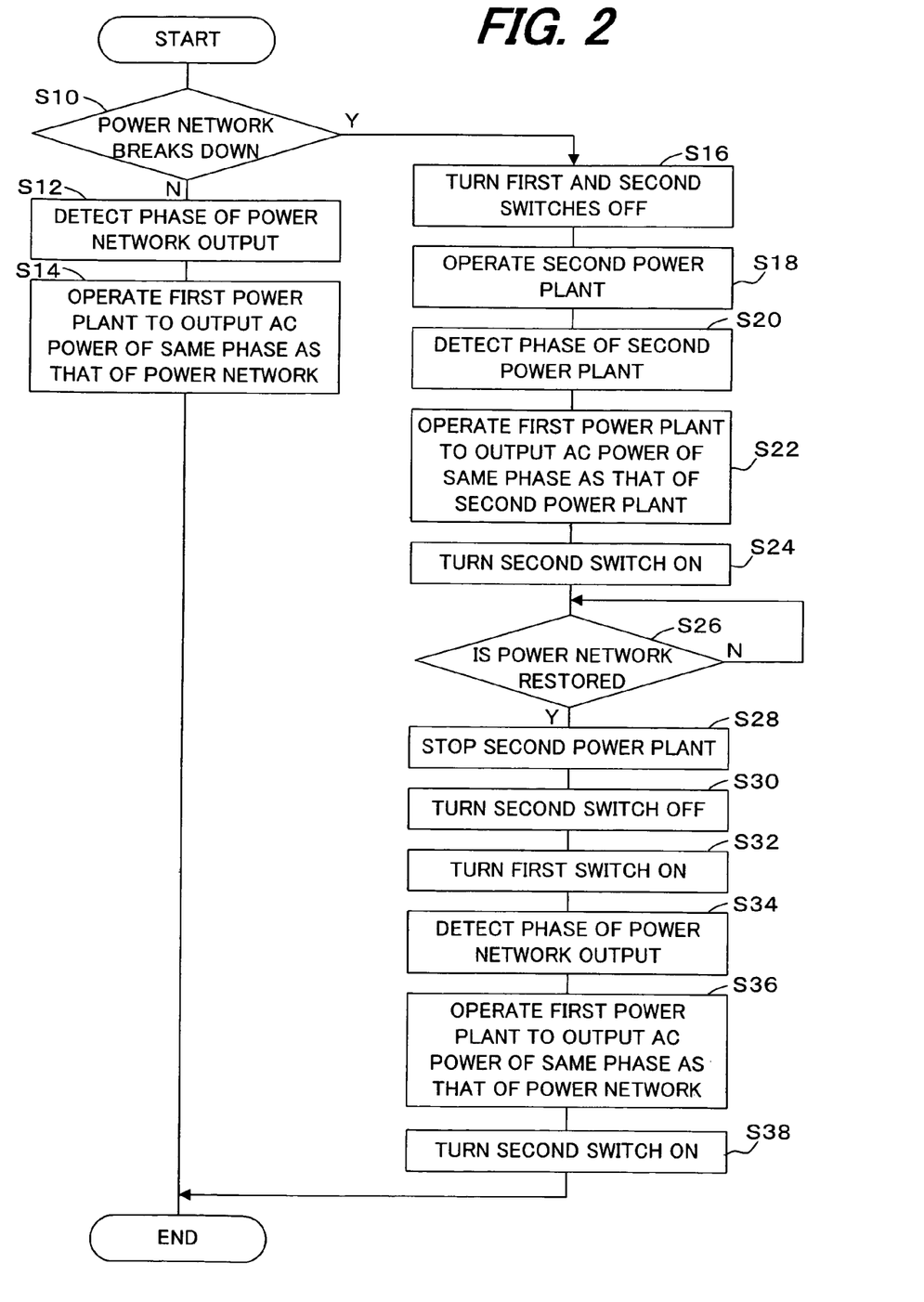
FIG. 2 is a flowchart showing the operation of the cogeneration system illustrated in FIG. 1.

FIG. 2 is a flowchart showing the operation of the cogeneration system 10, more exactly the sequence of operations of the ECU 50.

First, in S10, it is determined whether the power network 12 breaks down (a power outage has occurred). This determination is made based on the output of the first current-voltage sensor 52. Specifically, the power network 12 is determined to be normal when the first current-voltage sensor 52 produces a predetermined output indicating supply of AC power, and the power network 12 is determined to break down when the output is not produced.

When the result in S10 is NO, i.e., when the power network 12 is determined to be normal, the program proceeds to S12, in which the phase of the power network 12 output (AC power) is detected from the output of the first current-voltage sensor 52.

The program proceeds next to S14, in which the first engine 30 is started and the first power plant 20 is operated to output AC power of the same phase as that of the power network 12, i.e., the first power plant 20 is operated in synchronism with the power network 12. At the same time, the second switch 34e is turned ON.

Figure 3:
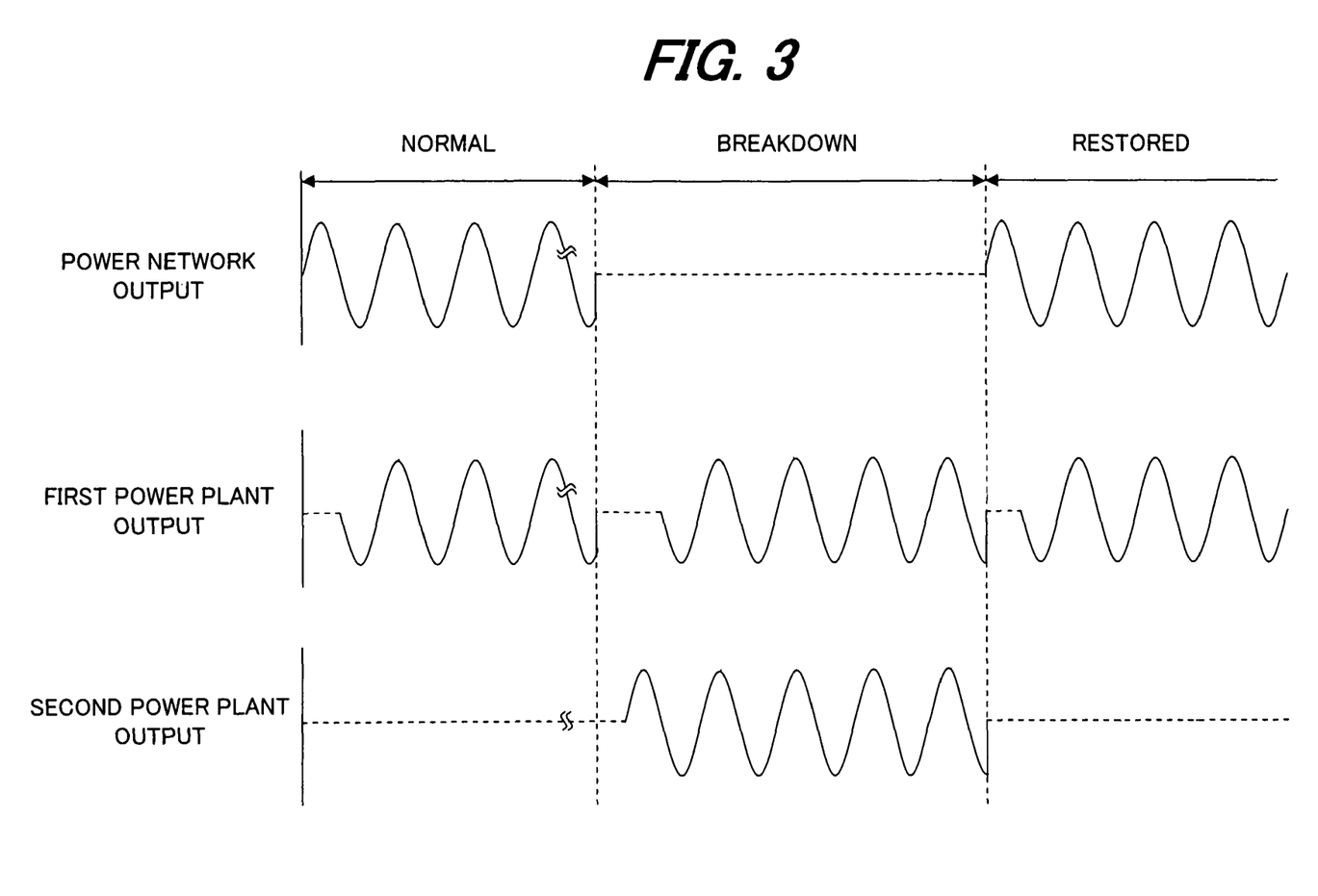
FIG. 3 is a time chart explaining a synchronous operation of power plants referred to in the flowchart of FIG. 2.

FIG. 3 is a time chart explaining the synchronous operation of the first power plant 20.

As shown in the time chart, when the power network 12 is normal, the first power plant 20 is operated to output AC power of the same phase as that of the output of the power network 12. Specifically, the ECU 50 supplies a signal representing the detected AC power output of the power network 12 to the inverter circuit 34c via a signal line. In response, the inverter circuit 34c outputs AC power of a same phase with that indicated by the received signal.

The inverter circuit 34c supplies the electrical load 14 with AC power coinciding with the AC power of the power network 12 at least in phase, through the second feed line 44, connection 18 and first feed line 16.

Thus when the power network 12 is normal, the first power plant 20 is driven to synchronously output AC power of the same phase as the detected phase of the AC power from the power network 12, such that the cogeneration system 10 is interconnected with or in cooperation with the power network 12. As a result, the electrical load 14 is supplied both with power from the power network 12 and with power from the first power plant 20. The electrical load 14 is operated with power from the first power plant 20 when this power is sufficient. When it is insufficient, the electrical load 14 is also supplied with supplementary power from the power network 12.

Returning to the explanation of the flowchart of FIG. 2, when the result in S10 is YES, i.e., when a power network 12 outage is determined to have occurred, the program proceeds to S16, in which the first switch 24 is turned OFF and the second switch 34e is also turned OFF. That is, the first switch 24 is turned OFF to cut off or interrupt power supply from the power plant 20 to the power network 12, thereby preventing reverse power flow. At the same time, the second switch 34e is turned OFF to once cut off power supply from the first power plant 20 to the electrical load 14.

Next, in S18, the second power plant 60 is started to be driven and in S20, the phase of the output (AC power) of the second inverter 66 (inverter circuit 66b) of the second power plant 60 is detected by the second current-voltage sensor 54.

The program proceeds next to S22, in which the first power plant 20 is operated to output AC power of the same phase as that of the second power plant 60, i.e., the first power plant 20 is operated in synchronism with the second power plant 60. Specifically, the ECU 50 supplies a signal representing the detected AC power output of the second inverter 66 (inverter circuit 66b) to the inverter circuit 34c via the signal line, so that the inverter circuit 34c outputs AC power of a same phase with that indicated by the received signal. Next in S24, the second switch 34e is turned ON.

As shown in FIG. 3, when a power network 12 outage is determined to have occurred, the second power plant 60 is started and the first power plant 20 is operated to output AC power of the same phase as that of the output of the second power plant 60.

In this manner, the first power plant 20 is driven to synchronously output AC power of the same phase as the detected phase of the AC power from the second power plant 60, such that the first power plant 20 is interconnected with or in cooperation with the second power plant 60. As a result, the electrical load 14 is supplied both with power from the first power plant 20 and with power from the second power plant 60. The electrical load 14 is supplied with power, in addition to power of the first power plant 20, increased by that of the second power plant 60.

Returning to the explanation of the flowchart of FIG. 2, next in S26, it is determined whether the power network 12 is restored or back on (the power outage has ended). This determination is also made based on the output of the first current-voltage sensor 52.

When the result in S26 is NO, the aforesaid determination is repeated. When it is YES, the program proceeds to S28, in which the operation of the second power plant 60 is stopped. Next, the program proceeds to S30, in which the second switch 34e is turned OFF to once cut off the power supplied to the electrical load 14 from the first power plant 20, and to S32, in which the first switch 24 is turned ON to supply AC power from the power network 12 to the electrical load 14.

The program then proceeds to S34, in which the phase of the output (AC power) of the power network 12 is detected. Next in S36, similar to S14, the engine 30 is started and the first power plant 20 is operated to output AC power of the same phase as that of the power network 12 as shown in FIG. 3, i.e., the first power plant 20 is operated in synchronism with the power network 12. The program then proceeds to S38, in which the second switch 34e is turned ON. As a result, the electrical load 14 is supplied with both power from the power network 12 and power from the first power plant 20.

The cogeneration system 10 according to the first embodiment is thus equipped with the first and second power plants 20, 60 connected to the first AC power feed line 16 between the power network 12 and the electrical load 14 and with the first switch 24 installed in the first feed line 16 at a location upstream of the connection 18 where the first and second power plants 20, 60 are connected and is configured to respond to detection of an outage of the power network 12 by turning OFF the first switch 24 to cut off or interrupt power supply from the first power plant 20 to the power network 12. Owing to this configuration, reverse flow of the power from the cogeneration system 10, more precisely from the first power plant 20 into the power network 12 during an outage of the power network 12 can be reliably prevented.

Moreover, after the power supply from the first power plant 20 to the power network 12 has been cut off or interrupted, the second power plant 60 is started to supply AC power to the electrical load 14 and the phase of the output (AC power) of the second power plant 60 is detected. Then the first power plant 20 is operated to output AC power of the same phase as that of the second power plant 60, i.e., the first power plant 20 is operated in synchronism with the second power plant 60, such that the electrical load 14 is supplied both with power from the first and second power plants 20, 60. Owing to this configuration, it becomes possible to increase the power to be supplied to the electrical load 14 by the power of the second power plant 60.

In addition, the first and second power plants 20, 60 are not connected by a communication means or other similar means, but are connected to the power feed line 16 in parallel therewith such that the first power plant 20 is operated to output AC power of the same phase as that of the second power plant 60. With this, it becomes possible to operate the first and second power plants 20, 60 in interconnection or cooperation with each other, by simply detecting the phase of the output of the second power plant 60.

Further, since the second power plant 60 comprises the second generator 64 driven by the second internal combustion engine 62, it becomes possible to increase the power to be supplied to the electrical load 14 under simple structure. It becomes also possible to supply exhaust heat of the second engine 62 to the thermal load if desired. Specifically, although not mentioned in the above, the piping 36 may be guided to the muffler of the second engine 62 so as to utilize heat exhausted by the second engine 62. It becomes still possible to use, as the first power plant 20, not only the engine power plant 60 described in this embodiment, but also a fuel cell or the like.

A cogeneration system 10 according to a second embodiment of this invention will now be explained.

Figure 4:
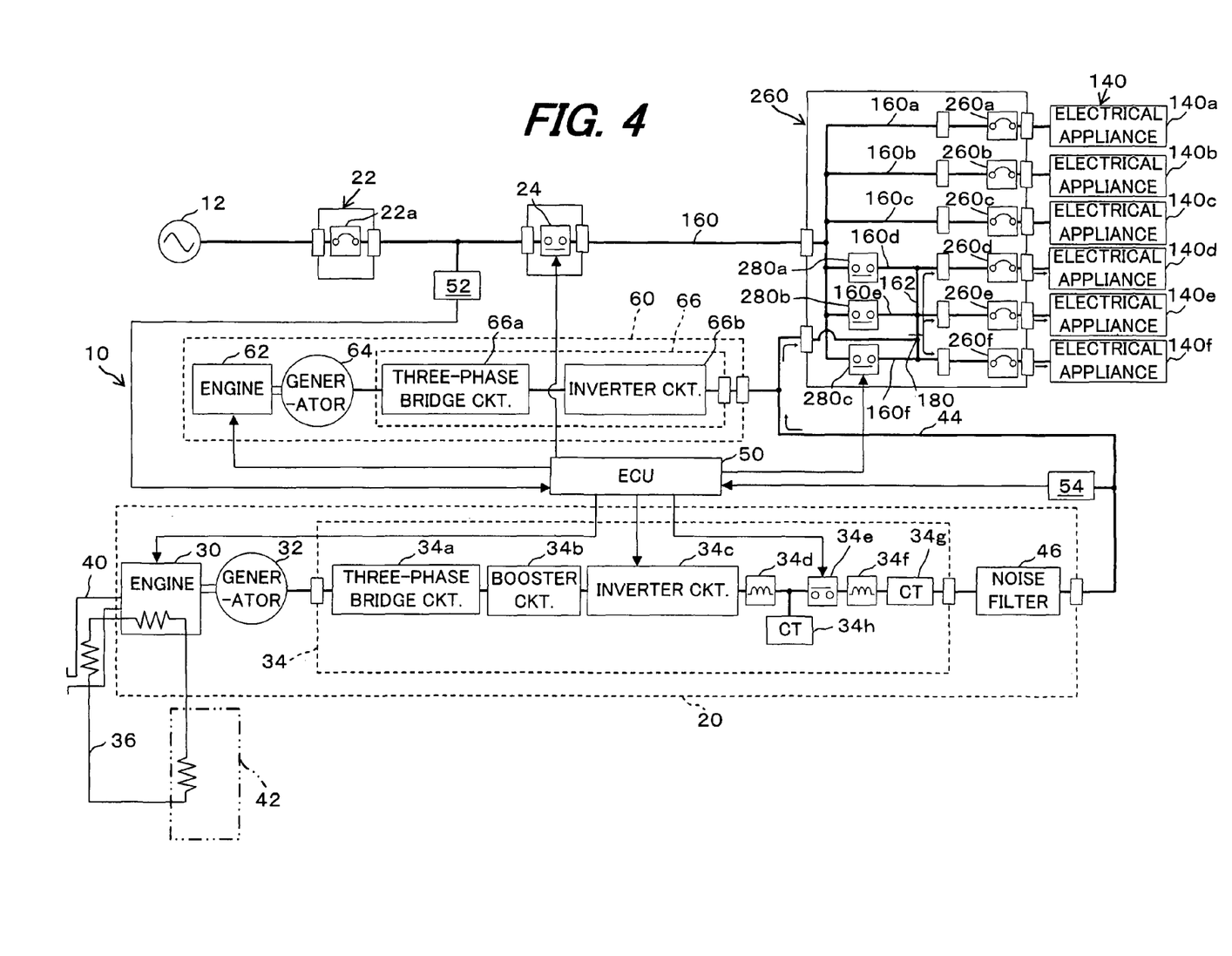
FIG. 4 is a block diagram, similar to FIG. 1, but showing the overall configuration of the cogeneration system according to a second embodiment.

FIG. 4 is a block diagram, similar to FIG. 1, but showing the overall configuration of the cogeneration system according to the second embodiment.

As mentioned above, when the power network 12 interconnected with the cogeneration system 10 experiences an outage, the ordinary practice is to shut down the cogeneration system 10 to prevent a reverse flow of its power output into the power network 12. In addition thereto, it should be preferable to continue power supply to a necessary one of the electrical appliances (electrical load) during outage of the power network. The second embodiment aims to achieve this.

The second embodiment will be explained with focus on points of difference from the first embodiment in the following.

In the second embodiment, the first and second power plants 20, 60 are connected to an AC power feed line (first feed line) 160 at a connection 180, and an electrical load 140 comprises six electrical AC appliances 140a, 140b, 140c, 140d, 140e, 140f. Among of them, the upper three, i.e., 140a to 140c are electrical appliances that need not be used on a constant basis. Typically, 140a might be a washing machine, 140b an air-conditioner, 140c microwave oven.

The lower three of 140d to 140f are electrical appliances that need to be used all of the time (or expected to be used during power network outage). For example, 140d is a lighting fixture, 140e a refrigerator, and 140f a television. In the following, the electrical appliances 140a to 140c are sometimes referred to as "ordinary appliances", those 140d to 140f as "necessary appliances".

Power consumption of the ordinary appliances is 140a: 0.5 kW, 140b: 0.8 kW, 140c: 1.0 kW and is 2.3 kW in total, while that of the necessary appliances is 140d: 0.5 kW, 140e: 0.7 kW, 140f: 0.7 kW and is 1.9 kW in total.

It should be noted here that although three appliances are each exemplified for the ordinary appliances and necessary appliances, it suffices if at least one appliance is provided for the necessary appliance.

The first feed line 160 is divided into six branch lines 160a, 160b, 160c, 160d, 160e, 160f at a circuit breaker panel 260. The upper three branches 160a, 160b, 160c are connected with the ordinary appliances of 140a, 140b, 140c, through associated breakers 260a, 260b, 260.

The lower three branches 160d, 160e, 160f are provided with third, fourth and fifth switches 280a, 280b, 280c and are connected with each other by a power line 162 at a location downstream of the third to fifth switches 280a, 280b, 280c. The second feed line 44 is connected, through a connection 180, to the power line 162, more precisely to a portion of the power line 162 that connects the branches 160e and 160f.

Downstream of the power line 162, the lower three branches 160d, 160e, 160f are connected with the necessary appliances 140d, 140e, 140f through associated breakers 260d, 260e, 260f.

With this, the first and second power plants 20, 60 are connected to the ordinary appliances 140a, 140b, 140c and necessary appliances 140d, 140e, 140f when the third to fifth switches 280a, 280b, 280c are turned ON, whereas the first and second power plants 20, 60 are disconnected with the ordinary appliances 140a, 140b, 140c and are only connected with the necessary appliances 140d, 140e, 140f when the third to fifth switches are turned OFF.

Figure 5:
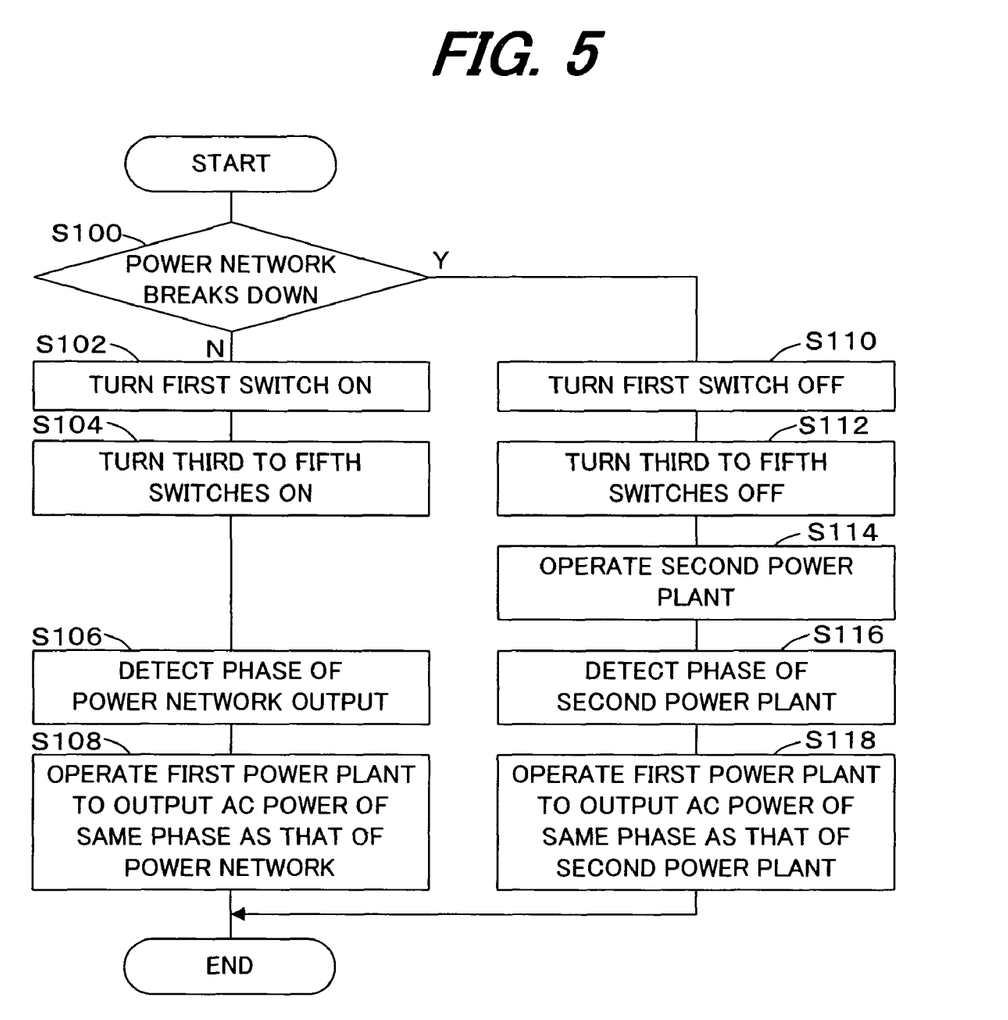
FIG. 5 is a flowchart, similar to part of the flowchart of FIG. 2, but showing the operation of the cogeneration system according to the second embodiment.

FIG. 5 is a flowchart, similar to part of the flowchart of FIG. 2, but showing a portion of the operation of the cogeneration system according to the second embodiment.

In the second embodiment, first in S100, it is determined whether the power network 12 breaks down (a power outage has occurred) in the same manner at that of the first embodiment.

When the result in S100 is NO, i.e., when the power network 12 is determined to be normal, the program proceeds to S102, in which the first switch 24 is turned ON to connect the power network 12 to the electrical load 140 and to S104, in which the third to fifth switches 280a, 280b, 280c are turned ON to connect the first power plant 20 to the electrical load 140, more specifically to the ordinary appliances 140a, 140b, 140c and necessary appliances 140d, 140e, 140f.

The program next proceeds to S106, in which the phase of the power network 12 output (AC power) is detected from the output of the first current-voltage sensor 52, and to S108, in which the first power plant 20 is operated to output AC power of the same phase as that of the power network 12.

Thus when the power network 12 is normal, the first power plant 20 is driven to synchronously output AC power of the same phase as the detected phase of the AC power from the power network 12, such that the electrical appliances 140a to 140f are supplied both with power from the power network 12 and with power from the first power plant 20. The electrical appliances 140a to 140f are operated with power from the first power plant 20 when this power is sufficient. When it is insufficient, they are also supplied with supplementary power from the power network 12.

On the other hand, when the result in S100 is YES, i.e., when a power network 12 outage is determined to have occurred, the program proceeds to S110, in which the first switch 24 is turned OFF to cut off or interrupt power supply from the first power plant 20 to the power network 12, thereby preventing reverse power flow.

The program next proceeds to S112, in which the third to fifth switches 280a, 280b, 280c are turned OFF such that power supply from the first power plant 20 to the ordinary appliances 140a, 140b, 140c is cut off, in other words the power from the first power plant 20 is only supplied to the necessary appliances 140d, 140e, 140f.

The program proceeds next in S114, the second power plant 60 is started and in S116, the phase of the output of the second power plant 60 is detected by the second current-voltage sensor 54, next to S118, in which the first power plant 20 is operated to output AC power of the same phase as that of the second power plant 60, i.e., the first power plant 20 is operated in synchronism with the second power plant 60. When the power network 12 is restored, the result in S100 becomes NO and the program proceeds to S102 and on.

With this, the AC power outputted from the first and second power plants 20, 60 in the same phase flows through the second feed line 44 to the power line 162, via the connection 180 and flows only to the necessary appliances 140d, 140e, 140f.

As mentioned above, since the maximum power output of the generator 32 in the first power plant 20 is 1.0 kW and the generator 64 in the second power plant 60 is the same output, their total output is set to 2.0 kW. On the contrary, the total power consumption of the necessary appliances 140d, 140e, 140f is 1.9 kW. Thus, since the maximum power output of the two power plants 20, 60 are set to a value that is equal to or greater than the total power consumption of the necessary appliances 140d to 140f, power supply to the necessary appliances can be kept continued during outage of the power network 12.

To be more specific, since the total power consumption of the ordinary appliances 140a, 140b, 140c is 2.3 kW, if the ordinary appliances and the necessary appliances are both operated during outage of the power network 12, the load may exceed the maximum power output of the plants 20, 64.

In view of the above, in the system in the second embodiment, when a power network 12 outage is determined to have occurred, the second power plant 60 is started and the outputs of the first and second power plants 20, 60 in the same phase are only supplied to the necessary appliances 140d, 140e, 140f by turning OFF the third to fifth switches 280a, 280b, 280c, i.e., by interrupting the power supply to the ordinary appliances 140a, 140b, 140c.

Owing this in the second embodiment, it becomes possible to continue power supply to necessary electrical appliances (electrical load) 140d to 140f during outage of the power network 12.

As stated above, the first and second embodiments are configured to have a cogeneration system (10) having a first power plant (20) connected to an AC power feed line (16, 160) between a power network (12) and an electrical load (14, 140) and a first internal combustion engine (30) for driving the first power plant such that exhaust heat of the first engine is supplied to a thermal load (42), comprising: a second power plant (60) connected to the feed line (16) at a connection (18) in parallel with the first power plant (20); a switch (24) installed in the feed line (16, 160) at a location upstream of the connection (18, 180); a power network outage detector (ECU 50, 52, S10, S100) that detects outage of the power network (12); a power supply interrupter (ECU 50, S16) that interrupts power supply from the first power plant (20) to the power network (12) by turning off the switch (24), when the outage of the power network (12) is detected; and a power plant operator (ECU 50, S18 to S24, S110 to S118) that operates the second power plant (60), such that outputs of the first and second power plants (20, 60) are supplied to the electrical load (14) when the power supply from the first power plant (20) to the power network (12) is interrupted.

The system further includes: a first generator (32) included in the first power plant (20) and driven by the first engine (30); a second generator (64) included in the second power plant (60) and driven by a second internal combustion engine (62); a first inverter (34) connected to the first generator (32) to invert output of the first generator to AC power; a second inverter (66) connected to the second generator to invert output of the second generator to AC power; and a phase detector (ECU 50, S20) that detects phase of output of the second inverter (66); and the power plant operator operates the first inverter (34) to output the AC power in same phase as the detected phase of the output of the second inverter, such that inverted AC power of the first and second generators in the same phase are supplied to the electrical load (ECU 50, S22).

In the system, the electrical load (140) includes a plurality of electrical appliances (140a, 140b, 140c, 140d, 140e, 140f) and the system further includes: a second switch (third to fifth switches 280a, 280b, 280c) installed in the feed line (160) at a location downstream of the first switch (24); and the power plant operator turns the second switch (280a, 280b, 280c) off and operates the second power plant (60), such that outputs of the first and second power plants (20, 60) are supplied to one (140d, 140e, 140f) of the electrical appliances when the power supply from the first power plant (20) to the power network (12) is interrupted (ECU 50, S110 to S118).

In the system, the electrical appliances comprise an ordinary appliance (140a, 140b, 140c) that need not be used on a constant basis and a necessary appliance (140d, 140e, 140f) that needs to be used all of the time, and the one of the electrical appliances is the necessary appliance (140d, 140e, 140f).

In the system, maximum outputs of the first and second power plants (20, 60) are set to be equal to or greater than power consumption of the necessary appliance (140d, 140e, 140f).

It should be noted in the above that although the first embodiment of the cogeneration system set out in the foregoing is configured to start the first engine 30 and operate the first power plant 20 when an outage of the power network 12 has not been detected, it is possible instead to adopt a configuration that activates operation of the first power plant 20 in response to the use condition of the electrical load 14 and/or thermal load. Similarly, although it is configured to start the second engine 62 and operate the second power plant 60 when an outage of the power network 12 has been detected, it is possible instead to operate the second power plant 60 in response to the use condition of the electrical load 14 and/or thermal load.

It should also be noted in the above that although the embodiments of the cogeneration system use the exhaust heat of the engine 30 to make hot water, it is possible instead to use it to make hot air for air conditioning.

It should still be noted that, although the embodiments of the cogeneration system set out in the foregoing are configured to detect the phase of the AC power output by the power network 12 and operate the power plant 20 to output AC power of the same phase as the detected phase, it is possible instead to adopt a configuration that operates the power plant 20 to output AC power of not only the same phase but also the same voltage.

It should yet still be noted that although the embodiments of the cogeneration system set out in the foregoing are configured to utilize an engine that runs on gasoline fuel as the prime mover (engine 30) for operating the power plant 20, it is possible instead to adopt a configuration that, for example, uses a gas engine that runs on town gas or liquid propane gas.

It should yet still be noted that although the embodiments of the cogeneration system set out in the foregoing are explained as using AC power of 100/200 V output by the power network 12, it goes without saying that if the voltage of the AC power output by the power network exceeds 100/200 V, the power plant 20 is configured to produce an output of corresponding voltage.

It should yet still be noted that although concrete values are given for the maximum power output of the generator 32 and the displacement etc. of the engine 30, the values given are merely examples and are not to be construed as placing any limit whatsoever on the invention.

Japanese Patent Applications (No. 2007-038224 and No. 2007-038226) both filed on Feb. 19, 2007, are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration system having a first power plant connected to an AC power feed line between a power network and an electrical load and a first internal combustion engine for driving the first power plant such that exhaust heat of the first engine is supplied to a thermal load, comprising:
a second power plant connected to the feed line at a connection in parallel with the first power plant, the second power plant including a second internal combustion engine for driving the second power plant;
a switch installed in the feed line at a location upstream of the connection;
a power network outage detector that detects outage of the power network;
a power supply interrupter that interrupts power supply from the first power plant to the power network by turning off the switch, when the outage of the power network is detected;
a first generator included in the first power plant and driven by the first engine;
a second generator included in the second power plant and driven by the second internal combustion engine;
a first inverter connected to the first generator to invert output of the first generator to AC power;
a second inverter connected to the second generator to invert output of the second generator to AC power;
a phase detector that detects phase of output of the second inverter; and
a power plant operator that operates the second power plant, such that outputs of the first and second power plants are supplied to the electrical load when the power supply from the first power plant to the power network is interrupted and operates the first inverter to output the AC power in same phase as the detected phase of the output of the second inverter, such that inverted AC power of the first and second generators in the same phase are supplied to the electrical load.

2. The system according to claim 1, wherein the electrical load includes a plurality of electrical appliances and further including:
a second switch installed in the feed line at a location downstream of the first switch;
and the power plant operator turns the second switch off and operates the second power plant, such that outputs of the first and second power plants are supplied to one of the electrical appliances when the power supply from the first power plant to the power network is interrupted.

3. The system according to claim 2, wherein the electrical appliances comprise an ordinary appliance that need not be used on a constant basis and a necessary appliance that needs to be used all of the time, and the one of the electrical appliances is the necessary appliance.

4. The system according to claim 3, wherein maximum outputs of the first and second power plants are set to be equal to or greater than power consumption of the necessary appliance.

5. The system according to claim 1, wherein the thermal load is stored water.

6. The system according to claim 1, wherein the second power plant is operated only when the power supply from the first power plant to the power network is interrupted.

7. A method for controlling a cogeneration system that includes:
a first power plant connected to an AC power feed line between a power network and an electrical load having a first internal combustion engine for driving the first power plant such that exhaust heat of the first engine is supplied to a thermal load;
a second power plant connected to the feed line at a connection in parallel with the first power plant, the second power plant having a second internal combustion engine for driving the second power plant;
a switch installed in the feed line at a location upstream of the connection;
a second switch installed in the feed line at a location downstream of the first switch;
a power network outage detector that detects outage of the power network;
a power supply interrupter that interrupts power supply from the first power plant to the power network by turning off the switch, when the outage of the power network is detected;
a first generator included in the first power plant and driven by the first engine;
a second generator included in the second power plant and driven by the second internal combustion engine;
a first inverter connected to the first generator to invert output of the first generator to AC power;
a second inverter connected to the second generator to invert output of the second generator to AC power; and
a phase detector that detects phase of output of the second inverter, the method comprising:
determining an outage of the power network;
turning off the first and second switches;
initiating the operation of the second power plant;
detecting a phase of the second power plant;
operating the first power plant to output AC power matching the phase of the second power plant; and
turning the second switch on.

8. The method according to claim 7, further comprising:
detecting the restoration of the power network;
stopping the second power plant;
turning the second switch off;
turning the first switch on;
detecting a power network phase of the power network;
operating the first power plant to output AC power matching the power network phase; and
turning the second switch on.

* * * * *